(12) United States Patent
Tengner

(10) Patent No.: US 9,257,870 B2
(45) Date of Patent: Feb. 9, 2016

(54) BATTERY ENERGY STORAGE, BATTERY ENERGY STORAGE SYSTEM, METHOD, COMPUTER PROGRAM AND COMPUTER PROGRAM PRODUCT

(71) Applicant: ABB Research Ltd., Zurich (CH)

(72) Inventor: Tomas Tengner, Vasteras (SE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 14/535,805

(22) Filed: Nov. 7, 2014

(65) Prior Publication Data

US 2015/0069839 A1 Mar. 12, 2015

Related U.S. Application Data

(63) Continuation of application No. PCT/EP2012/059206, filed on May 16, 2012.

(51) Int. Cl.
| | | |
|---|---|---|
| *H02J 1/10* | (2006.01) | |
| *H02J 7/34* | (2006.01) | |
| *H02J 9/00* | (2006.01) | |
| *H02J 3/32* | (2006.01) | |
| *H02J 7/00* | (2006.01) | |
| *H01M 10/42* | (2006.01) | |
| *H02M 3/07* | (2006.01) | |
| *H02M 3/158* | (2006.01) | |
| *H02M 7/483* | (2007.01) | |

(52) U.S. Cl.
CPC .............. *H02J 9/00* (2013.01); *H01M 10/4264* (2013.01); *H02J 3/32* (2013.01); *H02J 7/0029* (2013.01); *H02M 3/07* (2013.01); *H02M 3/158* (2013.01); *H02M 2007/4835* (2013.01); *Y02E 40/10* (2013.01); *Y10T 307/527* (2015.04)

(58) Field of Classification Search
CPC ............. H02J 3/32; H02J 7/0029; H02J 9/00; Y10T 307/527; H02M 2007/4835; H02M 3/07; H02M 3/158; H01M 10/4264
USPC ....................................... 307/48, 44
See application file for complete search history.

(56) References Cited

U.S. PATENT DOCUMENTS

| | | |
|---|---|---|
| 8,120,290 B2 | 2/2012 | King |
| 2008/0157732 A1 | 7/2008 | Williams |

FOREIGN PATENT DOCUMENTS

| | | |
|---|---|---|
| CN | 102077454 A | 5/2011 |
| CN | 102122833 A | 7/2011 |

(Continued)

OTHER PUBLICATIONS

International Search Report & Written Opinion Application No. PCT/EP2012/059206 Completed: Jan. 23, 2013; Mailing Date: Feb. 4, 2013 pp. 9.

(Continued)

*Primary Examiner* — Hal Kaplan
(74) *Attorney, Agent, or Firm* — Whitmyer IP Group LLC

(57) ABSTRACT

A battery energy storage arranged to be connected to a capacitor link, which is connected in parallel to a power converter. The battery energy storage includes a battery module and a direct current energy source connected in series with a voltage source converter. The voltage source converter is adapted to insert a positive voltage when the voltage of the battery module falls below a first threshold value, and to insert a negative voltage when the voltage of the battery module exceeds a second threshold value. The direct current energy source is adapted to be either charged or discharged during the voltage insertion by the voltage source converter. The disclosure also provides a battery energy storage system including such battery energy storage.

11 Claims, 3 Drawing Sheets

(56) References Cited

FOREIGN PATENT DOCUMENTS

| | | | |
|---|---|---|---|
| EP | 2184832 A1 | 5/2010 | |
| WO | 9941828 A1 | 8/1999 | |
| WO | 2009155986 A1 | 12/2009 | |
| WO | 2012035395 A1 | 3/2012 | |

OTHER PUBLICATIONS

First Office Action from China Application No. 201280072569.8 May 6, 2015 7 pages.

BATTERY ENERGY STORAGE, BATTERY ENERGY STORAGE SYSTEM, METHOD, COMPUTER PROGRAM AND COMPUTER PROGRAM PRODUCT

FIELD OF THE INVENTION

The technology disclosed herein relates generally to the field of battery systems, and in particular to battery energy storage systems comprising such battery energy storages.

BACKGROUND OF THE INVENTION

A battery energy storage system (BESS) typically comprises a power converter, such as a STATic VAr COMpensator (STATCOM), and batteries connected to one or more direct current (DC) link capacitor(s) of the power converter. The batteries enable the power converter to consume and deliver reactive power as well as active power to an electric power grid at the point of connection.

The batteries often comprise electro-chemical batteries, which have a varying output voltage. For such batteries the output voltage may vary 30% or even more during a full charge-discharge cycle. If the batteries are connected directly in parallel with the DC link capacitor of the power converter, the DC link voltage of the power converter will be determined by the battery voltage and hence vary during discharge of the batteries. This requires a de-rating of the power converter that is proportional to the battery voltage variation.

In a BESS that has an active power rating (MW-rating) that is equal or close to its apparent power rating (MVA-rating) such de-rating could possibly be acceptable. However, in a BESS that has a MVA rating that is significantly higher than the MW rating, the cost for de-rating the power converter can become large compared to the active power that is added.

A known way of avoiding de-rating is to use a DC/DC boost converter, or a DC-DC buck converter, or a DC-DC buck-boost converter, which is arranged to keep the converter's DC-link voltage constant. However, such solution has a disadvantage in that with a constant load current from the load, the discharge current of the battery will increase during discharge and hence provide a larger voltage drop. The battery therefore has to be dimensioned to be able to handle this increased current, which increases the cost.

SUMMARY OF THE INVENTION

An object of the present disclosure is to overcome or at least alleviate one or more of the above mentioned problems.

The object is, according to a first aspect, achieved by a battery energy storage arranged to be connected to a capacitor link, which is connected in parallel to a power converter. The battery energy storage comprises a battery module and a direct current energy source connected in series with a voltage source converter. The voltage source converter is adapted to insert a positive voltage when the voltage of the battery module falls below a first threshold value, and to insert a negative voltage when the voltage of the battery module exceeds a second threshold value. The direct current energy source is adapted to be either charged or discharged during the voltage insertion by the voltage source converter.

Large voltage drops in the battery energy module is avoided, owing to the extra power that is delivered from the DC energy storage.

Further, low voltage switching devices may be used when implementing the present disclosure. Still further, the present disclosure provides a very cost-efficient and competitive solution since de-rating of the power converter, e.g. STATCOM, is avoided. The additional cost for adding the DC energy storage is in many cases much lower than the cost for de-rating of the power converter.

In an embodiment, the battery energy storage comprises a direct current to direct current converter, a primary side of which is connected to the battery module and a secondary side of which is connected to the direct current energy source.

In an embodiment, the energy storage capacity of the direct current energy source is less than 30% of the energy storage capacity of the battery module, in particular less than 10% of the energy storage capacity of the battery module.

In different embodiments, the voltage source converter comprises an H-bridge converter or a cascaded H-bridge multilevel converter.

In various embodiments, the direct current energy source comprises a supercapacitor, or an electro-chemical battery.

In an embodiment, the battery energy storage comprises two or more direct current energy sources.

The object is, according to a second aspect, achieved by a battery energy storage system comprising a power converter, a capacitor link connected in parallel with the power converter and a battery energy storage as in any of the above embodiments connected in parallel to the capacitor link. Advantages corresponding to the earlier mentioned are obtained.

In an embodiment, the battery energy storage system comprises a control device adapted to control the power converter and/or the voltage source converter.

The object is, according to a third aspect, achieved by a computer program for a control device controlling a battery energy storage system comprising a power converter, a capacitor link connected in parallel with the power converter and a battery energy storage connected in parallel to the capacitor link. The battery energy storage comprises a battery module and a direct current energy source connected in series with a voltage source converter. The computer program comprises computer program code which when run on the control device causes the control device to: determine that the battery module voltage falls below a first threshold value, $Thres_1$, or that the battery module voltage exceeds a second threshold value, $Thres_2$, and control the voltage source converter to insert a positive voltage when the voltage of the battery module falls below the first threshold value, and to insert a negative voltage when the voltage of the battery module exceeds the second threshold value.

The object is, according to a fourth aspect, achieved by a computer program product comprising a computer program as above and a computer readable means on which the computer program is stored.

Further features and advantages of the invention will become clear upon reading the following description and the accompanying drawings.

DETAILED DESCRIPTION OF THE INVENTION

Figure 1:
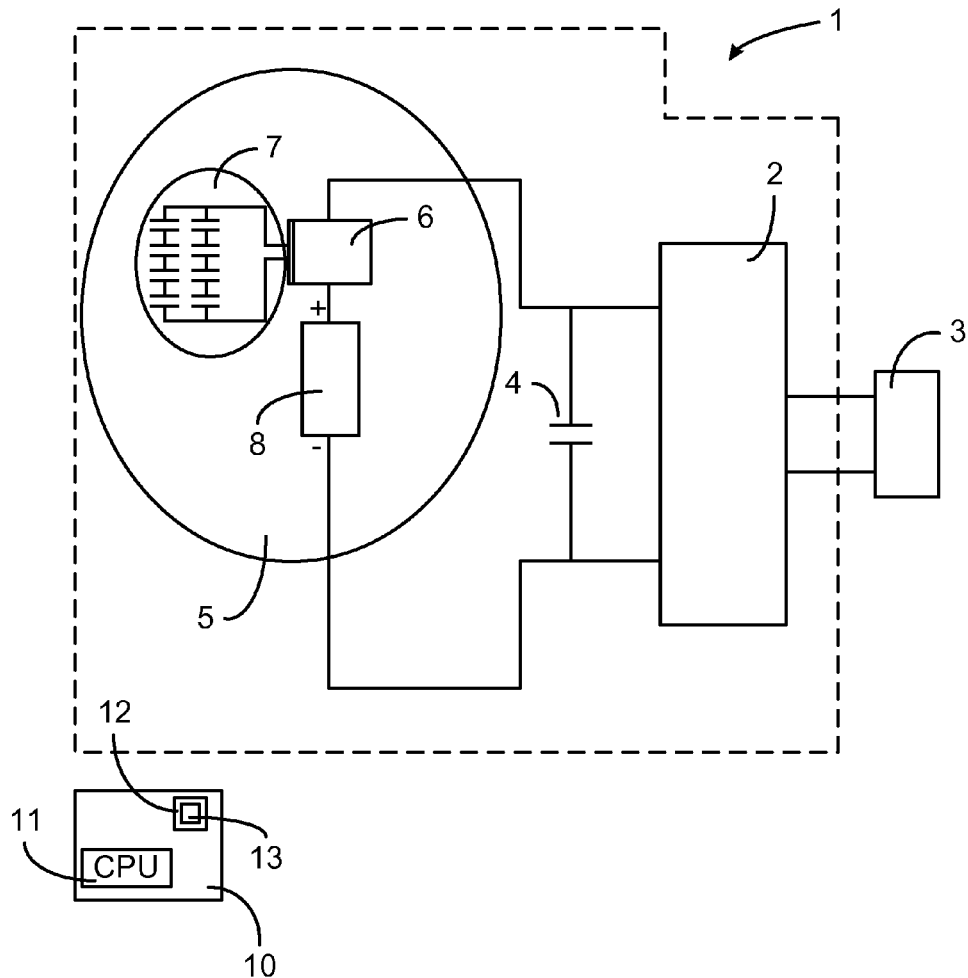
FIG. 1 illustrates an embodiment of the present disclosure.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the present disclosure describes devices and methods for stabilizing the DC output voltage from a battery module and thereby avoiding costly de-rating of the apparatus, e.g. a power converter, to which the battery is connected.

FIG. 1 illustrates schematically an embodiment of the present disclosure in an environment in which it may be implemented. In particular, a battery energy storage system 1 is illustrated comprising a power converter 2, e.g. a STATCOM. A direct current (DC) link capacitor 4, also denoted DC capacitor 4, is connected in parallel to the power converter 2. Although illustrated as a single capacitor, the DC capacitor 4 may comprise a bank of series-connected capacitors. That is, the power converter 2 is on its DC side connected to the DC link capacitor 4. The power converter 2 is on its alternating current (AC) side connected to a load 3, for example the electric power transmission system.

In an aspect, a battery energy storage 5 is provided. The battery energy storage 5 comprises one or more battery energy module(s) 8 (only one illustrated) which is connected in parallel with the DC capacitor 4. The battery energy module 8 may comprise e.g. one or more electro-chemical batteries.

The battery energy storage 5 further comprises a voltage source converter (VSC) 6 connected in series with the battery energy module 8. The VSC 6 may for example comprise an H-bridge converter or a cascaded H-bridge multilevel converter. It is noted that other single-phase converters may alternatively be used, e.g. low voltage single-phase converters.

The operation of the voltage source converter 6 is controlled by a control device 10. The same control device 10 may be adapted to control also the power converter 2. The device 10 comprises a processing unit 11, e.g. a central processing unit, microcontroller, digital signal processor (DSP), etc., capable of executing software instructions, e.g. a computer program 13, stored in a computer program product 12 e.g. in the form of a memory.

The VSC 6 is provided with, i.e. connected to, a DC energy storage 7, which for example may comprise a supercapacitor (SC) as illustrated in the FIG. 1, or a high power battery energy storage (HPB). The DC energy storage 7 is also denoted short-term energy storage in the present disclosure.

It is noted that the battery energy storage 5 may comprise one, two or more such direct current energy sources 7.

Figure 2:
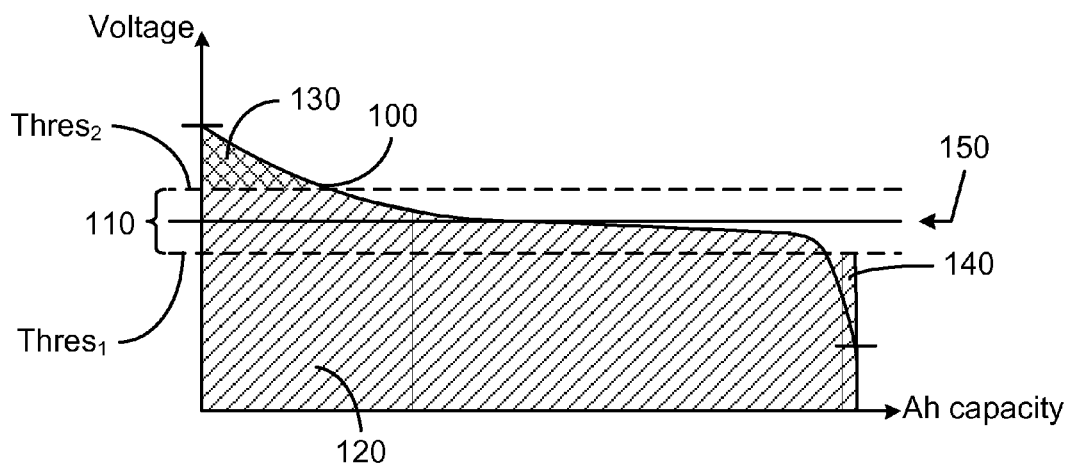
FIG. 2 illustrates a voltage-capacity characteristic for a battery energy module.

In FIG. 2, a typical discharge curve 100 of the battery energy module 8 is illustrated. The voltage of the battery energy module 8 is indicated at the y-axis as function of its capacity expressed in Ampere-hour (the x-axis). The hatched area 120 thus represents energy.

Due to hysteresis in the battery voltage of the battery energy module 8, a certain amount of voltage variation has to be allowed. At reference numeral 110 such acceptable voltage variation is indicated as a range. In the exemplifying illustration, the hysteresis requires a voltage variation of 3%. This can be compared to a voltage variation of 25% if the battery energy storage 5 would not have the DC energy storage 7.

In order to stabilize the output voltage from the battery energy module 8, the VSC 6 is arranged to insert a positive voltage when the battery energy storage 5 voltage is lower than a specified limit, a first threshold value (Thres$_1$ in FIG. 2). The positive voltage compensates for an undesired low voltage in the battery energy module 8. When the voltage of the battery energy module 8 is higher than a specified limit, a second threshold value (Thres$_2$ in FIG. 2), the VSC 6 is arranged to insert a negative voltage in order to compensate for an undesired high voltage in the battery energy module 8.

The battery energy module 8 current will charge and discharge the DC energy storage 7 while the VSC 6 inserts a voltage in series with the battery energy module 8. The hatched areas 130 and 140 represent energy that is stored and released, respectively, from the DC energy storage 7. The inserted voltage is typically small compared to the voltage of the battery energy module 8, and therefore the energy capacity that the DC energy storage 7 is required to have is small compared to the energy capacity of the battery energy module 8.

By using the VSC 6 and the DC energy storage 7, the operation of the battery module 8 within the hatched areas 130 and 140 is avoided; the operation can instead be maintained within the interval indicated at reference numeral 110. At reference numeral 150 a nominal voltage, also denoted target voltage and reference voltage, of the battery energy module 8 is indicated. How to choose this is described more in the following.

Figure 3A:
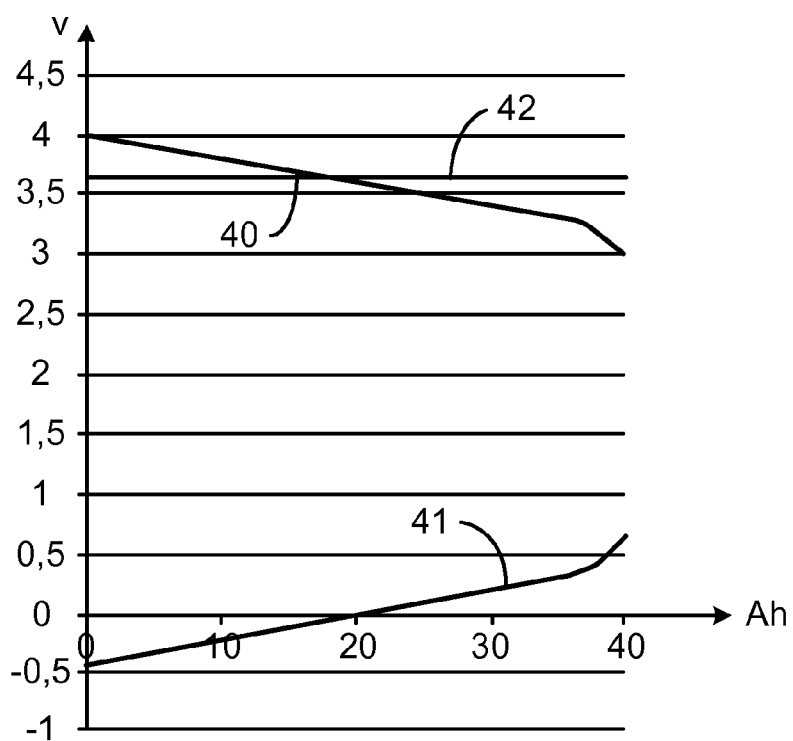
FIG. 3a illustrates voltage profiles during discharge.

FIG. 3a illustrates voltage profiles during discharge, wherein the voltage is indicated at the y-axis as function of the capacity measured in Ah and indicated at the x-axis. The curve indicated at reference numeral 40 illustrates the voltage profile of the battery module 8 and the curve indicated at reference numeral 41 indicates the voltage profile of the DC energy source 7. The curve indicated at reference numeral 42 indicates the sum of these two voltages: battery module 8 voltage+DC energy source 7 voltage, i.e. the voltage of the DC link capacitor 4 (or equivalently the voltage of the battery energy storage 5). As can be seen, the sum of the voltages can be kept at a desired set target voltage (3.6 V in the illustrated case) and well within the interval 110 (refer to FIG. 2).

Figure 3B:
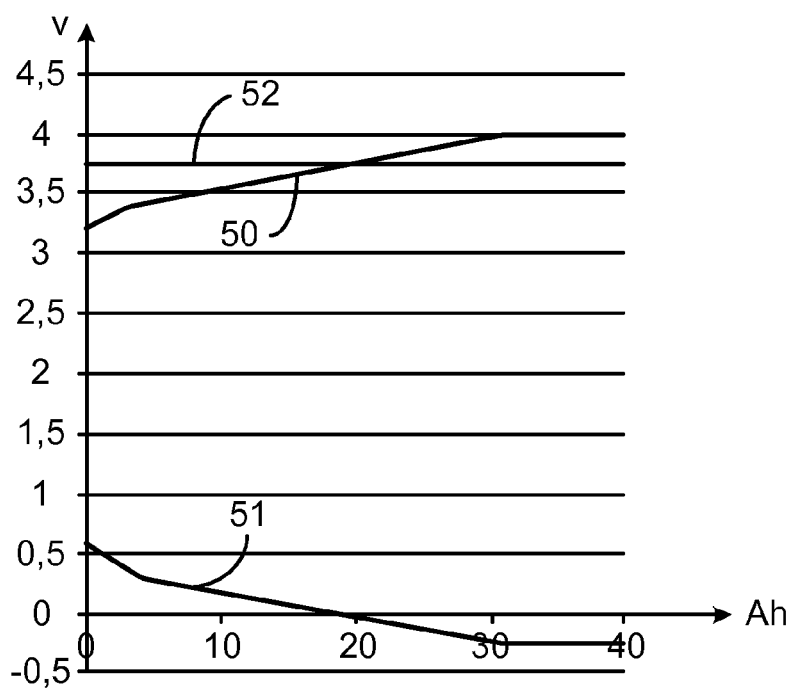
FIG. 3b illustrates voltage profiles during charging.

FIG. 3b illustrates voltage profiles during charging. As above, the voltage is indicated at the y-axis as function of the capacity measured in Ah and indicated at the x-axis. The curve indicated at reference numeral 50 illustrates the voltage profile of the battery module 8 and the curve indicated at reference numeral 51 indicates the voltage profile of the DC energy source 7. The curve indicated at reference numeral 52 indicates the sum of these two voltages: battery module 8 voltage+DC energy source 7 voltage, i.e. the voltage of the DC link capacitor 4 (or equivalently the voltage of the battery energy storage 5). Again, the DC terminal voltage can be kept at a desired target voltage.

When sizing the DC energy source 7, the specific discharge characteristics (e.g. as exemplified in FIGS. 3a and 3b) of the battery energy storage 5 should be considered, as the most suitable size strongly depends on such characteristics. For example, a battery energy storage 5 type having flat discharge characteristics typically requires a direct current energy source 7 with smaller energy storage capacity. In an embodiment, the energy storage capacity of the direct current energy source 7 is less than 30% of the energy storage capacity of the battery energy storage 5, in particular less than 30%, less than 20%, less than 10%, less than 5%, less than 3% or even less than 2% of the energy storage capacity of the battery energy storage 5.

The terminal voltage of the battery energy storage 5 is controlled to the earlier mentioned target voltage. Generally, the battery energy module 8 may be chosen in dependence on the type of battery used, e.g. depending on the chemical composition thereof, and how it will be loaded in use, i.e. in its particular application. The battery energy module 8 may be selected and the energy that would be required from the DC energy source 7 may be calculated by integrating the voltage curve of the DC energy source 7. The target voltage may then be adjusted so that the DC energy source 7 used is charged as much as it is discharged, i.e. so that the state-of-charge (SOC) of the DC energy source 7 is maintained within a desired range. With reference again to FIG. 2, this would mean that the hatched areas 130 and 140 would be approximately equal.

Figure 4:
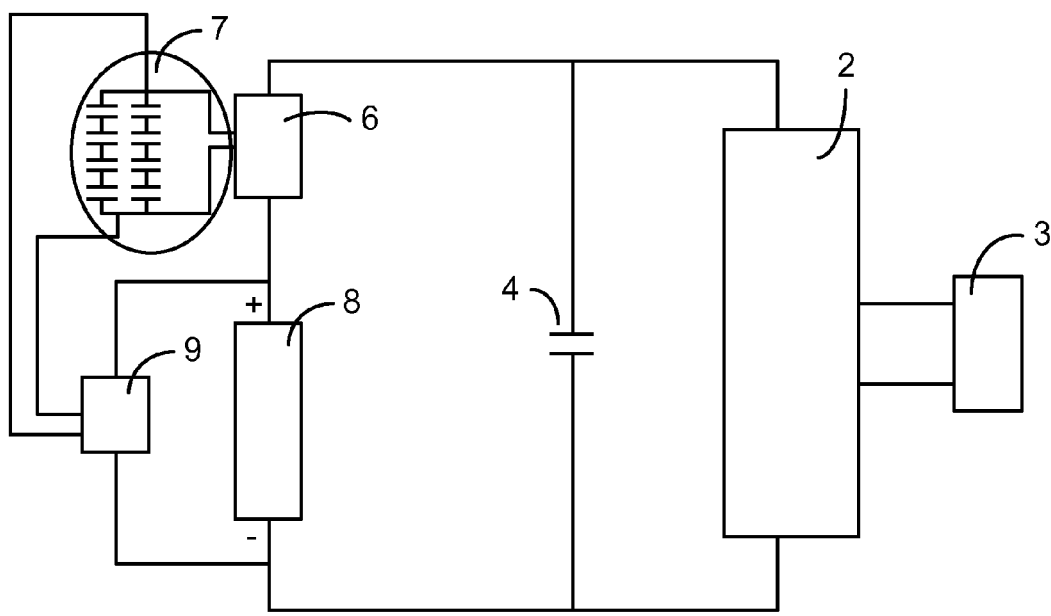
FIG. 4 illustrates an embodiment of the present disclosure.

FIG. 4 illustrates an embodiment of the present disclosure. This embodiment is similar to the embodiment described with reference to FIG. 1, but with the addition of a DC/DC converter 9, in particular an isolated DC-DC converter. The primary side of the DC-DC converter 9 is connected to the battery module 8 and the secondary side of the DC-DC converter 9 is connected to the DC energy source 7. The DC-DC converter 9 may be used together with the DC energy source 7 to power the VSC 6. If such DC-DC converter 9 is used, the capacity required by the DC energy source 7 may be reduced even further.

In an aspect thus, a battery energy storage 5 is provided. The battery energy storage 5 is arranged to be connected to a capacitor link 4, which is connected in parallel to a power converter 2 and the battery energy storage 5 comprises a battery module 8 as described earlier. The battery energy storage 5 further comprises a DC energy source 7 connected in series with a voltage source converter 6, wherein the voltage source converter 6 is adapted to insert a positive voltage when the voltage of the battery energy module 8 falls below a first threshold value, and to insert a negative voltage when the voltage of the battery energy module 8 exceeds a second threshold value. The direct current energy source 7 is adapted to be either charged or discharged during the voltage insertion by the voltage source converter 6.

Figure 5:
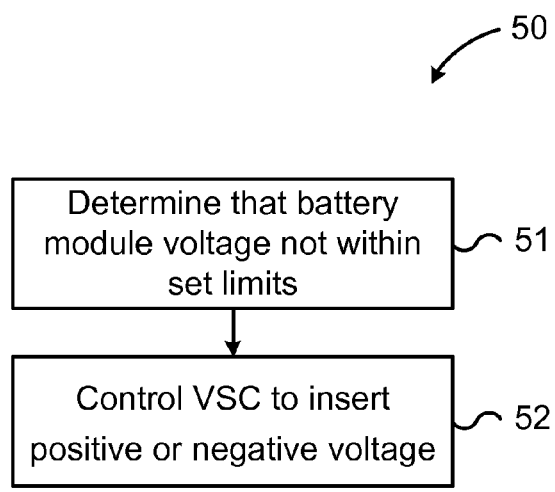
FIG. 5 is a flow chart of a method for controlling a battery energy storage.

In another aspect, and with reference to FIG. 5, a method 50 for controlling such battery energy storage 5 is provided. The method 50 comprises determining 51 that the battery module 8 voltage falls below a first threshold value, $Thres_1$, or that the battery module 8 voltage exceeds a second threshold value, $Thres_2$. That is, determining that the battery module 8 voltage is not within set limits of an interval 110. The method 50 then comprises controlling 52 the VSC 6 to insert a positive voltage when the voltage of the battery module 8 falls below the first threshold value, and to insert a negative voltage when the voltage of the battery module 8 exceeds the second threshold value. The battery module 8 voltage may thus be kept within the set limits.

The method 50 may be implemented in hardware, software or any combination thereof. For example, a computer program 13 (refer to FIG. 2) may be provided comprising computer program code which when run on e.g. the control device 10 causes the control device 10 to determine that the battery module 8 voltage falls below a first threshold value, $Thres_1$, or that the battery module 8 voltage exceeds a second threshold value, $Thres_2$, and to control the VSC 6 to insert a positive voltage when the voltage of the battery module 8 falls below the first threshold value, and to insert a negative voltage when the voltage of the battery module 8 exceeds the second threshold value.

A computer program product 12 (refer to FIG. 1) is also provided comprising the computer program 13 and computer readable means on which the computer program 13 is stored. The computer program product 12 may be any combination of read and write memory (RAM) or read only memory (ROM). The computer program product 12 may also comprise persistent storage, which, for example can be any single one or combination of magnetic memory, optical memory, or solid state memory.

In contrast to the known solution of using a DC/DC boost converter, the present disclosure does not suffer from the large voltage drops in the battery energy module 8, owing to the extra power that is delivered from the DC energy storage 7. Further, while the DC/DC boost converter solution requires power electronic switches that are rated for the full battery voltage, the embodiments of the present disclosure may be implemented using low voltage switching devices.

The additional cost of the battery energy storage system 1 for adding the DC energy storage 7 is in many cases much lower than the cost for de-rating of the power converter 2 and the present disclosure provides a very cost-efficient and competitive solution.

What is claimed is:

1. A battery energy storage arranged to be connected to a capacitor link, which is connected in parallel to a power converter, the battery energy storage comprising a battery module and characterized by a direct current energy source connected in series with a voltage source converter, wherein the voltage source converter is adapted to insert a positive voltage when the voltage of the battery module falls below a first threshold value, and to insert a negative voltage when the voltage of the battery module exceeds a second threshold value, and wherein the direct current energy source is adapted to be either charged or discharged during the voltage insertion by the voltage source converter.

2. The battery energy storage as claimed in claim 1, comprising a direct current to direct current converter, a primary side of which is connected to the battery module and a secondary side of which is connected to the direct current energy source.

3. The battery energy storage as claimed in claim 1, wherein the energy storage capacity of the direct current energy source is less than 30% of the energy storage capacity of the battery module.

4. The battery energy storage as claimed in claim 1, wherein the voltage source converter comprises an H-bridge converter or a cascaded H-bridge multilevel converter.

5. The battery energy storage as claimed in claim 1, wherein the direct current energy source comprises a supercapacitor or an electro-chemical battery.

6. The battery energy storage as claimed in claim 1, comprising two or more direct current energy sources.

7. A battery energy storage system comprising a power converter, a capacitor link connected in parallel with the power converter and a battery energy storage as claimed in claim 1 connected in parallel to the capacitor link.

8. The battery energy storage system as claimed in claim 7, comprising a control device adapted to control the power converter and/or the voltage source converter.

9. A method for controlling a battery energy storage system comprising a power converter, a capacitor link connected in parallel with the power converter and a battery energy storage connected in parallel to the capacitor link, the battery energy storage comprising a battery module and a direct current energy source connected in series with a voltage source converter, the method comprising:
   determining that the battery module voltage falls below a first threshold value, or that the battery module voltage exceeds a second threshold value, and
   controlling the voltage source converter to insert a positive voltage when the voltage of the battery module falls below the first threshold value, and to insert a negative voltage when the voltage of the battery module exceeds the second threshold value.

10. A non-transitory computer readable medium having stored thereon a computer program for a control device controlling a battery energy storage arranged to be connected to a capacitor link, which is connected in parallel to a power converter, the battery energy storage comprising a battery module and a direct current energy source connected in series with a voltage source converter, the computer program comprising computer program code which when run on the control device cause the control device to:
- determine that the battery module voltage falls below a first threshold value, or that the battery module voltage exceeds a second threshold value, and
- control the voltage source converter to insert a positive voltage when the voltage of the battery module falls below the first threshold value, and to insert a negative voltage when the voltage of the battery module exceeds the second threshold value.

11. The non-transitory computer readable medium as claimed in claim 10, wherein the computer program is part of a computer program product.

* * * * *